(No Model.)

C. W. WEISS.
CASH REGISTER AND RECORDER.

No. 495,764.

Patented Apr. 18, 1893.

(No Model.)  7 Sheets—Sheet 2.

C. W. WEISS.
CASH REGISTER AND RECORDER.

No. 495,764.  Patented Apr. 18, 1893.

(No Model.)

C. W. WEISS.
CASH REGISTER AND RECORDER.

No. 495,764.

Patented Apr. 18, 1893.

Fig. 4.

Attest:
A. N. Jesbera
A. Chdder

Inventor:
Carl W. Weiss
by William B. Greeley
Atty.

(No Model.)

C. W. WEISS.
CASH REGISTER AND RECORDER.

No. 495,764.

Patented Apr. 18, 1893.

Fig. 7.

Attest:
A. N. Jesbera
A. Shidder

Inventor:
Carl W. Weiss
by William B. Greeley
Atty.

UNITED STATES PATENT OFFICE.

CARL W. WEISS, OF BROOKLYN, NEW YORK, ASSIGNOR, BY MESNE ASSIGNMENTS, TO THE NATIONAL CASH REGISTER COMPANY, OF OHIO.

CASH REGISTER AND RECORDER.

SPECIFICATION forming part of Letters Patent No. 495,764, dated April 18, 1893.

Application filed October 4, 1892. Serial No. 447,798. (No model.)

*To all whom it may concern:*

Be it known that I, CARL W. WEISS, of Brooklyn, in the county of Kings and State of New York, have invented certain new and useful Improvements in Registers; and I do hereby declare that the following is a full and exact description thereof, reference being had to the accompanying drawings, and to the numerals of reference marked thereon, making a part of this specification.

The general object of this invention is to produce a register of simple and durable construction which shall yet be thoroughly efficient in operation, capable of registering any amount or value from a unit to any higher amount or value, not capable of being fraudulently manipulated by dishonest employés, and which may be operated by a single movement of one hand to effect the registry of any desired figure, with the result that the machine may be operated with great rapidity and ease.

The principle feature of the invention is the provision of an actuator which is also the setting device, the same having a single handle to be grasped by the operator and movable through a definite range of movement in different directions, whereby through suitable transmitting mechanism it imparts motion to the registering devices while the direction of its movement determines the selection of the value to be indicated, added or printed.

Other features will be pointed out hereinafter.

In the accompanying drawings.

The casing 10 is of suitable construction to inclose and partially support the operative parts of the register and may be mounted upon a base 11 in which a cash-drawer 12 may be fitted to slide. The front plate 13 of the casing 10 (see Figs 1 and 2) is formed with a series of slots 14, 14, radiating from a common center and severally designated by a cipher and the digital figures from 1 to 9 inclusive.

Figure 1:
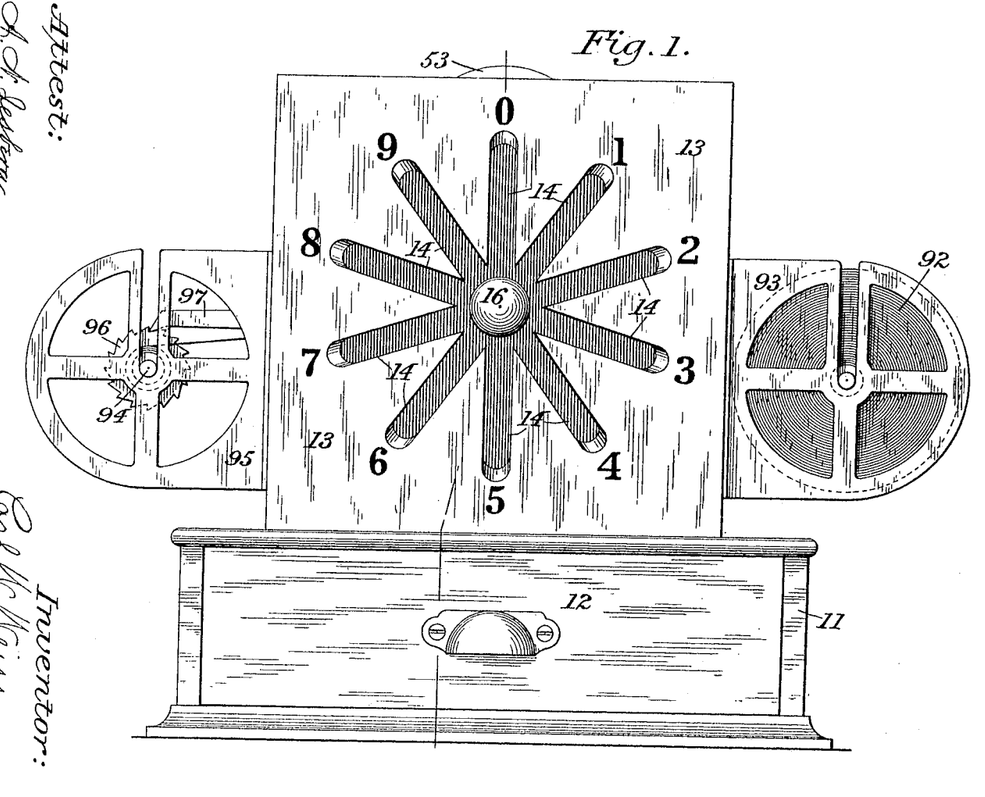
Figure 1 is an elevation of the front end of a register embodying my improvements.

The actuator, which is also the setting handle or device, is represented as a rod 15, which may be provided with a suitable knob or handle 16, and which projects through the front plate 13, standing normally in the center of the radiating slots 14, and having fixed thereto a ball 17 which has a bearing in a socket formed in a hollow casting 18 secured to a fixed portion of the frame-work. The ball and socket form a universal bearing for the rod and permit free angular movement thereof in any direction. A disk or plate 19 is fixed rigidly to the rod 15 near its bearing 17 so that it may have a considerable angular movement as the rod 15 is moved from its central position in one or another of the radiating slots 14. Parallel with the normal position of the rod 15 is supported in bearings a sliding rod or bar 20, (see Fig. 2) which is drawn to the front by a spring 21. A plate or ring 22 is fixed to the rod 20 in such position that when the parts are in normal position it shall rest against the disk 19 at all points of its circumference whereby as the rod 15 is moved on its bearing 17 in one direction or another a definite rectilinear movement shall be imparted to the rod 20. The ring 22 may be steadied in its movement, if necessary, by a guide-pin 23 which is fixed thereto at a point opposite the rod 20 and moves in an eye 24 secured to the fixed frame-work. The rectilinear movement of the rod 20 is converted into a rotary movement and imparted to other portions of the mechanism through a convenient arrragement of intermediate gearing, which, in the construction shown in the drawings, consists of a rack 25, fixed to the rod 20, and a pinion 26 and short shaft 27 which are mounted in suitable bearings in the frame-work. A gear 28, fixed to the shaft 27, meshes with a corresponding gear 29 which is formed on a short shaft 30. For convenience in arrangement of the several parts of the register the shaft 30 is hollow to permit the passage therethrough of the shaft 31, on which said shaft 30 may have its bearing.

Figure 2:
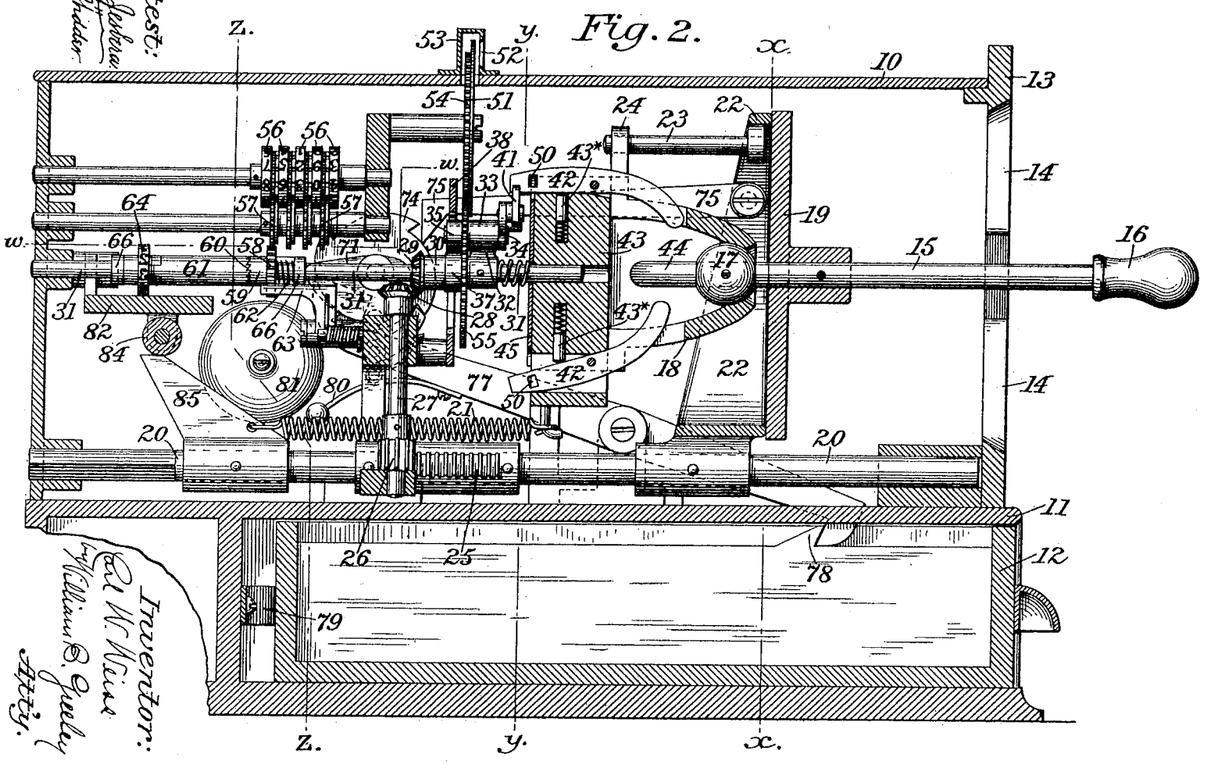
Fig. 2 is a longitudinal vertical section of the same.
Figure 3:
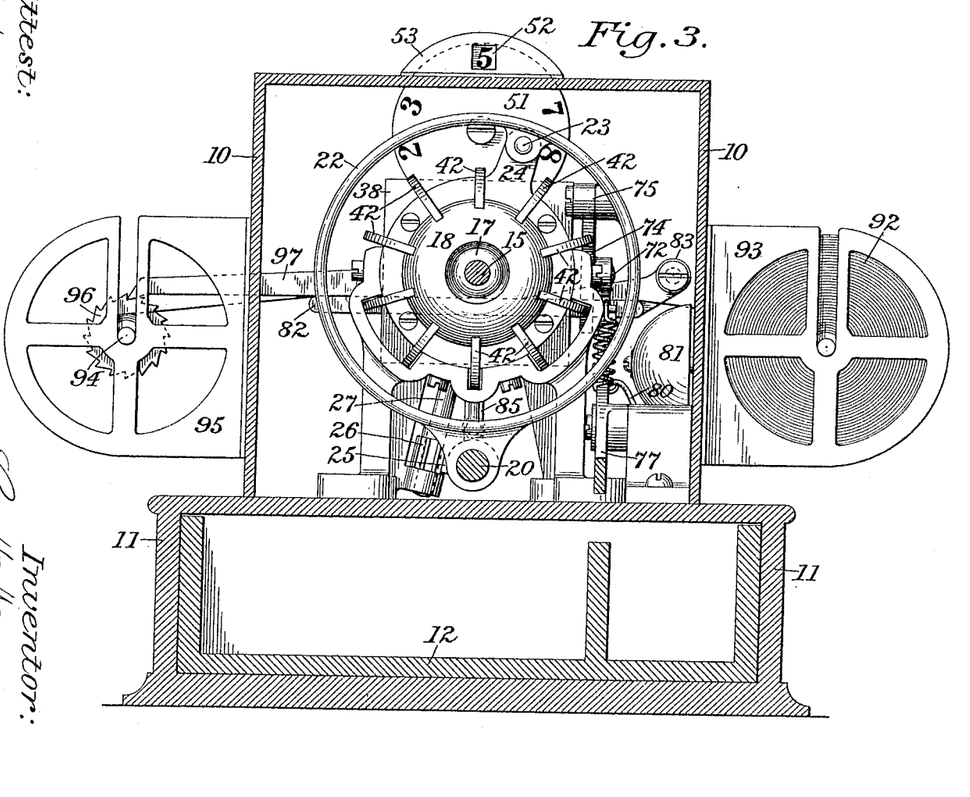
Fig. 3 is a section on the line $x$—$x$ of Fig. 2, looking toward the left.
Figure 4:
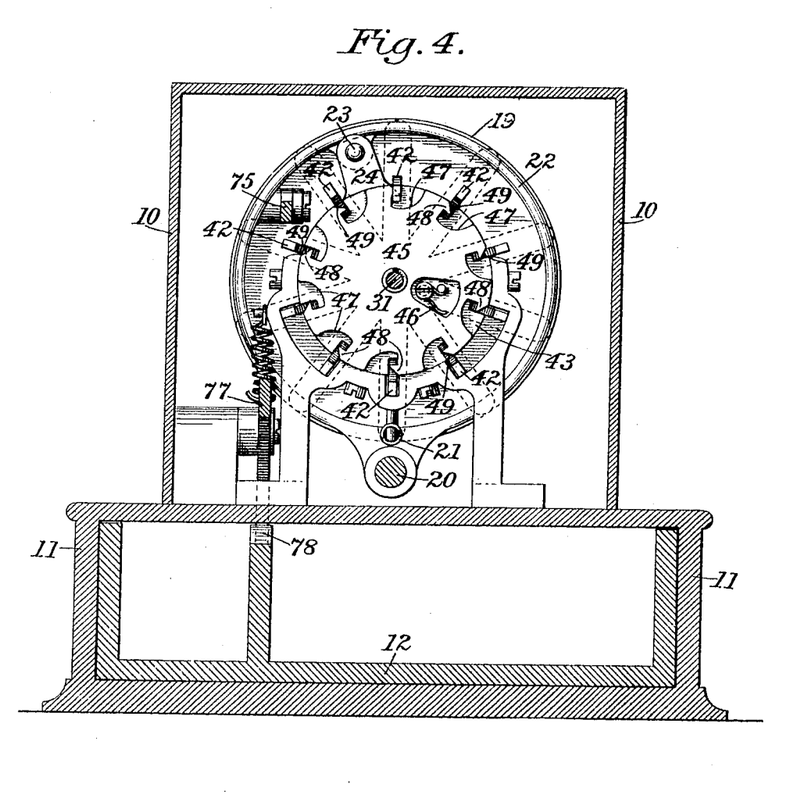
Fig. 4 is a section on the line $y$—$y$ of Fig. 2, looking toward the right.

The mechanism thus far described provides for imparting to the shaft 30 a full rotation in one direction each time the rod 15 is moved to its full extent into any one of the slots 14 and constitutes a driving mechanism for the parts of the register which may be coupled to the shaft 30 as hereinafter described. A full rotation of the shaft 30 in the opposite direction is effected through the spring 21 as the rod 15 is released. From the shaft 30 movement is imparted to the indicator, the printwheel and the adding-wheels, through a coupling which serves to connect each of said parts to the driving mechanism and to disconnect it therefrom, and I will presently describe how the movement of these parts is limited according to the value of the number which is to be registered. Fixed to the shaft 31 is an arm 32 (see Figs. 2 and 5) which has in its outer end a bearing 33 for a short shaft 34. One end of the shaft 34 carries a dog or latch 35 which is adapted to engage a notch 36 in a disk or hub 37 which is fixed to the shaft 30. In the plane of the latch 35 is fixed a ring or plate 38 having its central portion removed and its inner rim provided with a series of notches 39 which are adapted to receive the head of the dog or latch 35 when the latter is released from the notch 36 and to hold it in a fixed and definite position. The other end of the short shaft 34 has fixed thereto an arm 40 which bears at its outer end a pivoted spring-pressed trip 41, adapted when moving in one direction to yield as it strikes a stop which may be thrown into its path, but when moving in the opposite direction to be arrested by the stop while the arm 32 continues its movement sufficiently to cause the shaft 34 to be rocked on its axis slightly and raise the dog or latch 35 from the notch 36 in the disk or hub 37. The shaft 30, together with the rest of the driving mechanism, is thus allowed to complete its full movement while the shaft 31 is uncoupled therefrom and arrested at a point which is determined by the position of the stop referred to which is thrown into the path of the trip 41. On the return movement or backward rotation of the shaft 30, under the influence of the spring 21, the notched disk 37 picks up the dog or latch 35 and its supporting arm 32 at the point where it was previously left and returns it to its initial position. In order that the arm 32 and the shaft 31 to which it is fixed may be stopped at any desired point I have provided a series of stops which are adapted to be thrown into the path of the trip 41 by a movement of the rod 15. As shown in Figs. 2, 3 and 4, these stops consist of a series of levers 42, 42, corresponding to the several slots 14 in the front plate 13, and pivoted in radial slots formed in a circular block or plate 43 which is secured to the frame-work of the mechanism. The ends of these levers 42 project into the plane of movement of the trip 41, but are held normally outside of the path of the trip by spring-pressed plungers 43*. The tails of the levers project through slots within the casting 18 in such position that one or another shall be struck by an extension 44 of the rod 15, as the latter is moved into one or another of the slots 14, and shall be caused thereby to throw its front end into the path of the trip 41. In order that each lever 42 may be retained in its new position until another lever 42 has been operated and may be then released, I have provided a circular locking-plate 45 (see Fig. 4), which is loosely mounted on the shaft 31 and is normally pressed in one direction by a spring 46. The periphery of this plate is formed with a series of notches 47, one side of each notch being formed with a tooth 48 having an inclined outer edge 49. Each lever 42 is formed with a notch 50 to receive the corresponding tooth 48 of the disk 45. As each lever 42 is moved from its normal position, as illustrated by the lower lever 42, in Fig. 2, to its operative position, as shown by the upper lever in said figure, it strikes the incline 49 of the corresponding tooth 48 and turns the disk 45 far enough on its axis to release any other lever 42 which may have been previously moved into operative position while it is itself at once engaged by the corresponding tooth 48. Provision thus being made for rotating the shaft 31 to any predetermined extent at each operation of the rod 15, the indicator, printwheel, and adding-wheels may be operated directly or indirectly from this shaft. I have shown herein a common form of indicator, the same being composed of a disk 51 bearing on its face the several figures from 0 to 9 inclusive, which are adapted to be exhibited through a sight opening 52 in the housing 53. The disk 51 bears a gear 54 which meshes with and is driven by a similar gear 55 fixed to the shaft 31 or to the arm 32 to rotate therewith.

Figure 7:
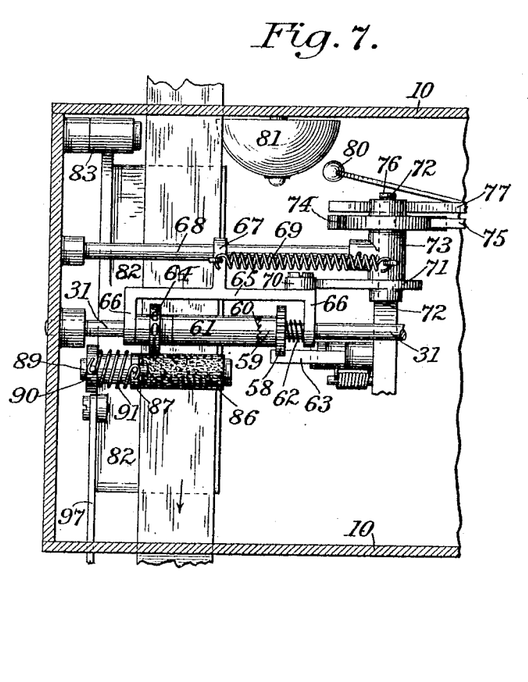
Fig. 7 is a detail horizontal section on the line $w$—$w$ of Fig. 2.

The adding wheels 56 (see Fig. 2) and their driving and transmitting gears 57 may be constructed and arranged as usual, the first gear 57 of the train being in mesh with and driven by a pinion 58 (see Figs. 2 and 7) which is fixed to a sleeve 59 mounted loosely on the shaft 31. The end of the sleeve 59 is formed with inclined teeth 60 to be engaged by corresponding teeth on the adjacent end of a sleeve 61 which is splined to the shaft 31 to rotate therewith, a spring 62 bearing upon the pinion 58 to hold the sleeve 59 in engagement with the sleeve 61 when the latter is rotated in a forward direction and to permit it to yield and the teeth 60 to slip freely when the sleeve 61 is rotated in the opposite direction. A hold pawl 63 is provided to engage the teeth of the pinion 58 and prevent any backward movement. As hereinafter described the pinion 58 and sleeve 61 are shifted longitudinally upon the shaft 31 as a change is made from one denomination to another, so that the pinion may actuate the gear 57 of the proper respective adding-wheel 56. The printing device is a single line of type which is adapted to be shifted in the direction of its length and in a direction at right angles thereto. I have shown it as a print-wheel 64 fast upon the sleeve 61, which is splined to the shaft 31, and partaking of the rotary movement of the shaft, but movable longitudinally thereon so that its location may be changed to correspond to the denomination of the particular number or figure to be registered. In practice the shifting of the print-wheel is accomplished automatically so that at each operation of the rod 15 a print-wheel is shifted successively from a higher to a lower denomination or from the lowest back again to the highest. A yoke 65 has two arms 66, 66, which slide upon the shaft 31 and include between them the sleeve 61 together with the sleeve 59, pinion 58 and spring 62. A short arm 67 rests upon a guide-rod 68 and a spring 69 draws the yoke and the associated parts toward the front of the machine. An anti-friction roller 70, carried by the yoke, rests against the periphery of a cam 71 which is fixed to a short shaft 72 mounted in a suitable bearing 73 supported by the frame-work. At the other end of the shaft 72 is fixed a ratchet-wheel 74 which has in the present instance four teeth and is advanced one step at each operation of the machine by a pawl 75 which is carried by the ring 22. Thus, when the yoke rests against the highest point of the cam 71, if the print-wheel is then in a position to print a units figure, the next operation of the rod 15 will advance the cam a quarter turn, thereby permitting the spring 69 to draw the yoke 65 and with it the print-wheel 64 back into a position to print tens of dollars. The succeeding movement of the cam will move the print-wheel into the positions to print units of dollars, tens of cents and units of cents successively. As described above, the driving pinion 58 for the adding train, is shifted with the print-wheel of the machine to advance the gear 57 to the corresponding denomination.

An eccentric pin or cam 76 may be fixed to the ratchet-wheel 74 (see Figs. 2 and 5) in such position as to operate, immediately after the registering and printing of units, the lever 77 which engages with a tooth 78 to hold the cash-drawer 12 against the tension of the spring 79. If desired a hammer 80 may also be fixed to the lever 77 and adapted to strike a gong 81 as the drawer is released.

Figure 6:
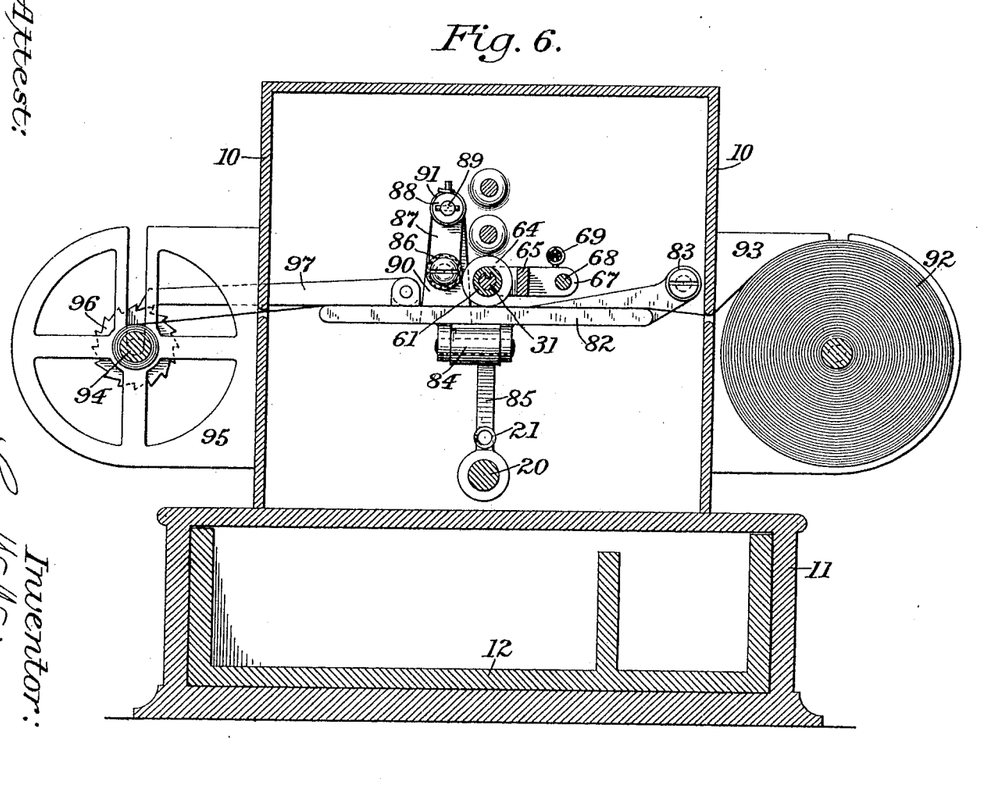
Fig. 6 is a section on the line $z$—$z$ of Fig. 2, looking toward the left.

The printing impact upon the print-wheel 64 may be produced in any usual manner, either upon a strip of paper or upon a separate check, but I have shown in the drawings (see Figs. 2 and 6) a convenient mechanism for this purpose. A platen 82 is hinged as at 83 and carries a roller 84 which rests upon a cam 85 fixed to the sliding bar 20. Thus the paper or check which is supported by the platen 82 will be brought into contact with the print-wheel 64 at each operation of the rod 15 with the result that an impression is made for every one of the four different positions of the print-wheel. An inking-roller 86 is carried at the lower end of an arm 87 which depends from a short sleeve 88 mounted upon a stud 89. The stud is carried by a post 90 which is erected upon the platen. A coiled spring 91 having one end fixed to the post 90 and the other to the arm 87, presses the inking roller 86 toward the print-wheel 64 and therefore at each movement of the platen the roller is caused to pass over the lower face of the print-wheel, so that even if the print-wheel be moved a single space only the type character thereon which is next required to make an impression will be properly inked.

When a ribbon of paper is employed to receive the impressions of the print-wheel the supply-roll may be mounted in brackets 93 at one side of the casing while the winding-roll is mounted on brackets at the opposite side of the casing. To provide for the feeding of the ribbon of paper a ratchet-wheel 96 may be fixed to the winding-roll 94 and adapted to be operated by a pawl 97 carried by the platen 82.

I have herein shown and described the printing device as mounted directly upon the shaft 31, but it is obvious that if desired it might be otherwise placed and driven through intermediate gearing, and that it might be a segment or a bar as well as a wheel.

Figure 5:
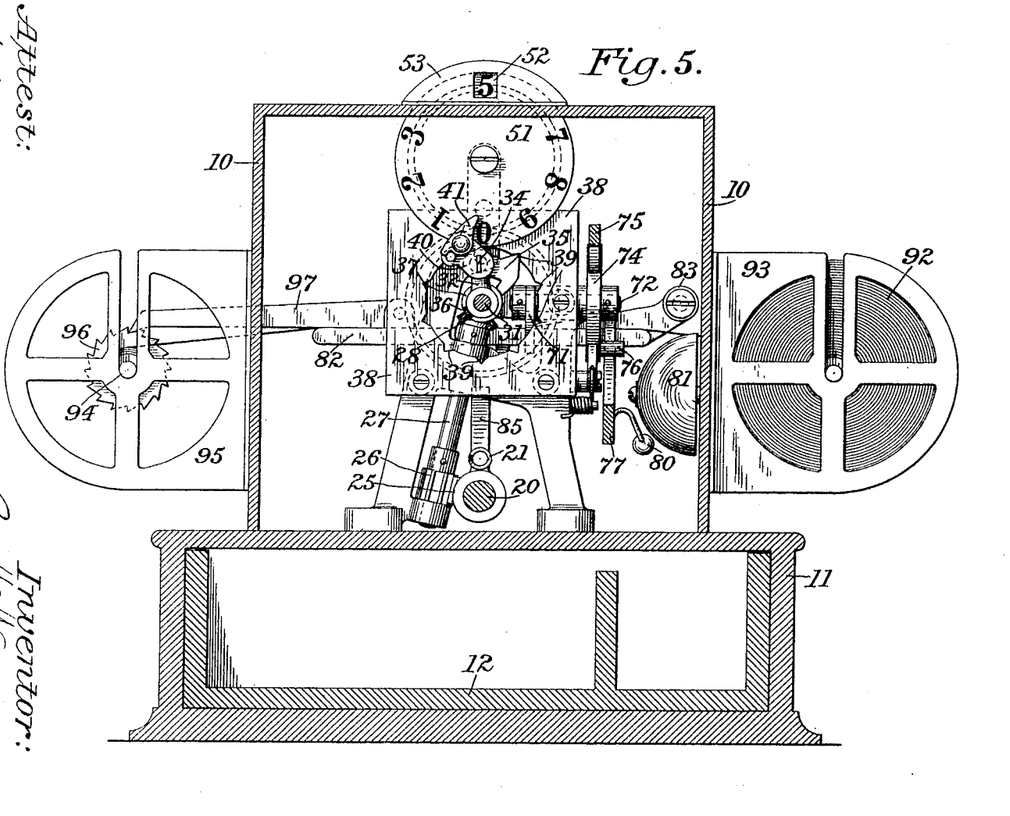
Fig. 5 is a section on the line $y$—$y$ of Fig. 2, looking toward the left.

To explain the operation of the register let it be supposed that five dollars and twenty cents are to be registered, it being assumed that the parts of the mechanism are in the position in which they were left at the end of the last previous registration, as represented in Figs. 2, 3 and 5, the last figure registered having been the figure 5. The operator grasping the handle 16, of the actuator, first moves the rod 15 to the limit of its movement into the slot 0 (Fig. 1). The movement of the disk 19 with the rod throws the ring 22 and the bar 20 a definite distance toward the left in Fig. 1 and through the intermediate gearing gives a full forward rotation to the short shaft 30. At the same time the extension 44 of the rod 15 strikes the tail of the lowermost or "0" stop-lever 42, causing its other end to strike the incline of the corresponding tooth 48 on the locking-plate 45 and to oscillate the plate sufficiently on its axis to release the "5" stop-lever which was operated previously. The direction of movement of the actuator thus selects the value to be registered or, in the construction shown, determines the extent of movement of the registering devices. As soon as the "0" stop-lever has been moved to the full extent to bring the slot 50 therein into line with the point of the tooth 48, the plate 45 springs back and locks the stop-lever in its new position. The end of the stop-lever is thus held in the path of the trip 41. As the shaft 30 starts from its initial position while the detent 35 was left by the last operation in the position corresponding to that of the figure "5," the said shaft moves alone until its notch reaches the position of the detent, when the latter moves into the notch under the influence of a spring (not shown) and moves the shaft to the end of its rotation, carrying with it the arm 33 and shaft 30 with their connected parts. As the ring 22 moves forward the pawl 75 advances the ratchet-wheel 74 as before stated and, through the described connections, the print-wheel is shifted from its extreme left-hand position, as seen in Fig. 2, to its extreme right-hand position, to print tens of dollars, and with it the pinion 58 into engagement with the right-hand gear 57, the cam 71 being so shaped that this movement takes place at the beginning of the movement of the ring 22. All the parts having now been set, the handle 16 is released by the operator and the spring 21 allowed to return the bar 20 to its normal position. By this movement of the bar 20 the ring 22 restores the disk 19 and the rod 15 to their normal positions. At the same time through the rack 25 and the intermediate gearing, the shaft 30 is rotated backward to its initial position. The detent 35 being still in engagement with the notch in the shaft 30, the shaft 31 and its connected parts will also be rotated backward until the trip 41 strikes the "0" stop-lever, when the detent is instantly raised from the notch, thereby stopping the print-wheel and the indicator at "0." Just as the bar 20 completes its movement the cam 85 raises the platen 82 to press the paper thereon against the print-wheel and produce an impression of the "0" which is at the line of print. In order that the platen and the paper thereon may always be free from the print-wheel while it is rotating, the rack 25 is of such a length that it is clear of the pinion 26 when the bar 20 is in its normal position and so that the cam 85 commences to move slightly before the pinion and continues to move slightly after the pinion is stopped. The operator now grasps the handle again and moves the rod 15 to its full extent into the slot "5" (Fig. 1). The ring 22 commences its movement, the pawl 75 again advances the ratchet-wheel 74 and the cam 71, thereby shifting the print-wheel into position to print units of dollars and the pinion 58 into mesh with the second pinion 57 from the right. Immediately thereafter the extension 44 of the rod 15 strikes the dial of the uppermost or "5" lever 42 (shown in Fig. 2) and forces its end down into the path of the trip 41, the stop being locked in position while that previously set is released as before described. The pinion 26 being now engaged by the rack 25, the shaft 31 begins its forward rotation and carries with it the detent 35 which drops into the notch in the shaft as soon as the latter begins its movement, both the shaft 30 and the detent 35 having this time started from their initial positions. The detent, and consequently the arm 32 and shaft 31 are carried forward with the shaft 30 to the end of its movement, the trip 41 yielding as it passes under the end of the "5" stop-lever. On the return movement or backward rotation of the shaft 30 the detent 35 and connected parts are carried with the shaft 30 until the trip 41 strikes the end of the said stop-lever. At this instant, therefore, the further movement of the shaft 31 is checked, with the indicator showing the figure 5 at the sight-opening and the print-wheel presenting the figure 5 at the line of print, while the shaft 30 completes its return movement under the action of the spring 21. The pinion 58, which remained stationary during the forward movement of the print-wheel, owing to the slipping of the tooth 60, partakes of the backward movement of the print-wheel and stops with it, thereby advancing the gear 57, with which it was in mesh, and the corresponding adding-wheel through the space of five units. The action of the cam 85 in producing the imprint, and of the ring 22 being the same for each imprint, the description thereof need not be repeated here. The registration of the next figure "2" is effected in a similar manner, save that the shaft 30 rotates alone until the notch therein comes in line with the end of the detent 35, which then drops into the notch and is carried with it to the end of its forward rotation, and on the return or backward rotation of the said shaft, is raised from the notch when the trip 41 strikes the end of the "2" stop-lever. The movement of the several parts is also similar when the last figure "0" is registered, with the addition that the lever 77 is operated by the pinion 76 to unlock the drawer 12 and strike the bell 81. The results of these several operations are to show on the indicator in succession the several figures 0, 5, 2, 0, to print in a diagonal line across the paper the figures 0520, and to add to the previous total on the adding-wheels the number 520, the adding wheels being arranged in a well known manner to be operated independently of each other and at the same time to transfer from each wheel of a lower denomination to that of the next higher the value of each full rotation of such wheel of the lower denomination.

It is obvious that the several details of my improved register may be varied without affecting the operation of the register or departing from the spirit of my invention. Therefore, although I have herein shown and described, for the purposes of illustration, certain specific mechanism, I do not intend to be understood as limiting the scope of my invention to such specific mechanism.

I claim as my invention—

1. In a register, an actuator movable through a definite range of movement in different directions from its normal position, the movement of the actuator irrespective of the direction operating the registering devices and the direction of such movement regulating the movement of the registering devices, whereby a single movement of the actuator effects the desired registration, substantially as shown and described.

2. In a register, the combination with registering devices and an actuator movable in different directions from its normal position, of transmitting mechanism moved by the actuator to shift the registering devices, and intermediate mechanism controlled by the direction of movement of the actuator to regulate the movement of the registering devices whereby a single movement of the actuator effects the desired registration, substantially as shown and described.

3. In a register, the combination of an actuator having a definite range of movement in different directions, transmitting mechanism moved by the actuator through a definite range of movement to shift the registering devices, and a series of stops operated severally by the movement of the actuator in different directions to determine the extent of movement of the registering devices, substantially as shown and described.

4. In a register, the combination of an actuator having a definite range of movement in different directions, transmitting mechanism moved by the actuator through a definite range of movement to shift the registering devices, a coupling included in said mechanism and a series of stops operated severally by the movement of the actuator in different directions to determine the point at which said coupling is disconnected, substantially as shown and described.

5. In a register, the combination of an indicator, driving mechanism therefor, a coupling to connect said indicator to said mechanism, a series of stops to disconnect said coupling, each at a determined point, and a rod having a universal bearing and movable radially thereon to operate any of said stops, substantially as shown and described.

6. In a register, the combination of an indicator, driving mechanism therefor, a coupling to connect said indicator to said driving mechanism, a series of movable stops to disconnect said coupling, each at a determined point, a rod having a universal bearing and movable thereon to operate any of said stops, and a plate having a series of radiating slots to guide the movements of the rod, substantially as shown and described.

7. In a register, the combination of an indicator, driving mechanism therefor, a coupling to connect said indicator to said driving mechanism and having a trip, a series of stop levers adapted severally to be moved into the path of said trip and a rod having a universal bearing and movable radially thereon to shift any of said levers into the path of said trip, substantially as shown and described.

8. In a register, the combination of an indicator, driving mechanism therefor, a coupling to connect said indicator to said driving mechanism and having a trip, a circular block having its axis concentric with the axis of movement of said trip, a series of spring-pressed stop levers pivoted upon said block to move in radial planes, a spring-pressed lock-plate mounted on the axis of said block and formed with a series of peripheral notches, each notch being formed on one side with a tooth having an inclined outer edge to be engaged by the corresponding stop-levers, and means to move each of said levers independently, substantially as shown and described.

9. In a register, the combination of a printing device, driving mechanism therefor, a coupling to connect said printing device to said driving mechanism, a series of movable stops to disconnect said coupling, each at a determined point, and a rod movable to operate any of said stops, substantially as shown and described.

10. In a register, the combination of a printing device, driving mechanism therefor, a coupling to connect said printing device and said driving mechanism, a series of movable stops to disconnect said coupling, each at a determined point, a rod having a universal bearing and movable to operate any of said stops, and a plate having a series of radiating slots to guide the movements of said rod, substantially as shown and described.

11. In a register, the combination of an adding-train, a gear to actuate said train, driving mechanism therefor, a coupling to connect said gear to said driving mechanism, a series of movable stops to disconnect said coupling, each at a determined point, and a rod having a universal bearing and movable radially thereon to operate any of said stops, substantially as shown and described.

12. In a register, the combination of an adding-train, a gear to actuate said train, driving mechanism therefor, a coupling to connect said gear to said driving mechanism, a series of movable stops to disconnect said coupling, each at a determined point, a rod having a universal bearing and movable to operate any of the said stops, and a plate having a series of radiating slots to guide the movements of the rod, substantially as shown and described.

13. In a register, the combination of a rod having a universal bearing, a disk fixed to said rod, a plate or ring supported to move in a path parallel with the normal position of the axis of said disk and normally resting against the face of said disk, an indicator, means to transmit movement thereto from said plate or ring, and means to uncouple the indicator and arrest its movement at predetermined points, substantially as shown and described.

14. In a register, the combination of a rod having a universal bearing, a disk fixed to said rod, a bar movable in bearings in a direction parallel with the normal position of the axis of said disk, a plate or ring carried by said bar and resting against the face of said disk, a rotatable shaft, gearing intermediate said bar and shaft to transmit the movement of the former to the latter, and an indicator coupled to said shaft, substantially as shown and described.

15. In a register, the combination of a rod having a universal bearing, a disk fixed to said rod, a bar movable longitudinally in bearings in a direction parallel with the normal position of the axis of said disk, a ring or plate carried by said bar and resting against the face of said disk, a rotatable shaft, gearing intermediate said bar and shaft to transmit the movement of the former to the latter, an indicator, a coupling to connect said indicator to said shaft, and means to disconnect said coupling at determined points, substantially as shown and described.

16. In a register, the combination of a rod having a universal bearing, a disk fixed to said rod, a bar movable longitudinally in bearings in a direction parallel with the normal position of the axis of said disk, a ring or plate carried by said bar and resting against the face of said disk, a rack also carried by said bar, a pinion in mesh with said rack, a shaft driven by said pinion, a second shaft axially in line with said first named shaft, a coupling carried by said shaft to connect the same with said first named shaft, means to disconnect said coupling at a determined point, and an indicator driven by said shaft, substantially as shown and described.

17. In a register, the combination of a rod having a universal bearing, a disk fixed to said rod, a plate or ring supported to move in a path parallel with the normal position of the axis of said disk, and normally resting against the face of said disk, a print-wheel, means to transmit movement thereto from said plate or ring and means to uncouple the print-wheel to arrest its movement at determined points, substantially as shown and described.

18. In a register, the combination of a rod having a universal bearing, a disk fixed to said rod, a bar movable in bearings in a direction parallel with the normal position of the axis of said disk, a plate or ring carried by said bar and resting against the face of said disk, a rotatable shaft, gearing intermediate said bar and shaft to transmit the movement of the former to the latter, a print-wheel, a coupling to connect said print-wheel to the said shaft, and means to disconnect said coupling at determined points, substantially as shown and described.

19. In a register, the combination of a rod having a universal bearing, a disk fixed to said rod, a plate or ring supported to move in a path parallel with the normal position of the axis of said disk and normally resting against the face of said disk, an adding-train, a driving pinion therefor, means to transmit movement thereto from said plate or ring and means to uncouple the pinion and arrest its movement at determined points, substantially as shown and described.

20. In a register, the combination of a rod having a universal bearing, a disk fixed to said rod, a bar movable in bearings in a direction parallel with the normal position of the axis of said disk, a plate or ring carried by said bar and resting against the face of said disk, a rotatable shaft, gearing intermediate said bar and shaft to transmit the movement of the former to the latter, an adding-train, a driving pinion therefor, a coupling to connect said pinion to said shaft, and means to disconnect said coupling at determined points, substantially as shown and described.

21. In a register, the combination of a printing device movable in the line of its length and in a direction at right angles thereto, driving mechanism therefor, a coupling to connect said printing device to its driving mechanism, and means to disconnect said coupling at determined points, and means to shift said printing device in a direction at right angles to the line of its length, substantially as shown and described.

22. In a register, the combination of a print-wheel rotatable in a plane at right angles to its axis and movable longitudinally on its axis, driving mechanism therefor, a coupling to connect said printing device to its driving mechanism, means to disconnect said coupling at determined points a cam actuated by said driving mechanism and means intermediate said cam and print-wheel to shift the latter longitudinally, substantially as shown and described.

23. In a register, the combination of a print-wheel rotatable in a plane at right angles to its axis and movable longitudinally on its axis, a cam and intermediate means for shifting said print-wheel longitudinally, a ratchet carried with said cam, a rod having a universal bearing, a disk fixed to said rod, a plate or ring supported to move in a path parallel with the normal position of the axis of said disk and normally resting against the face of said disk, a pawl actuated by said ring to advance said ratchet, and means intermediate said ring and print-wheel to rotate the latter, substantially as shown and described.

24. In a register, a printing device, a rod having a universal bearing, a disk fixed to said rod, a bar movable longitudinally in bearings parallel with the normal position of the axis of said disk, a plate or ring carried by said bar and resting normally against the face of said disk, a cam carried by said bar, and a platen actuated by said cam, substantially as shown and described.

25. In a register, the combination of a print-wheel, rotatable in a plane at right angles to its axis and movable longitudinally on its axis, a rod having a universal bearing, a disk fixed to said rod, a bar movable in bearings in a direction parallel with the normal position of the axis of said disk, a plate or ring carried by said bar and resting normally against the face of said disk, a cam carried by said bar, a platen operated by said cam and means actuated by said plate or ring to shift said print-wheel longitudinally, substantially as shown and described.

26. In a register, the combination of a printing device, a platen, means to move said platen toward and from the printing device, a post located on the said platen, an arm supported to swing on said post, an inking roller carried by the other end of said arm and a spring acting upon said arm to press the lever toward the printing device, substantially as shown and described.

27. In a register, the combination of a rod having a universal bearing, a disk fixed on said rod, a bar movable in bearings in a direction parallel with the normal position of the axis of said disk, a plate or ring carried by said bar and normally resting against the face of said disk, a pawl actuated by said ring, a ratchet adapted to be advanced step by step by said pawl, a cam carried by said ratchet, a cash drawer and a latch therefor adapted to be released by said cam, substantially as shown and described.

28. In a register, the combination of an adding-train, each wheel of the train having an independent driving gear, a single driving pinion for said gears movable longitudinally on its axis, a rod having a universal bearing, a disk fixed on said rod, and a plate or ring supported to move in a direction parallel with the normal position of the axis of said disk and normally resting against the face of said disk, a pawl carried with said plate or ring, a ratchet adapted to be advanced step by step by said pawl, a cam carried by said ratchet, means intermediate said cam and said driving pinion to shift the latter longitudinally and means to rotate said pinion, substantially as shown and described.

In testimony whereof I have signed my name to this specification in the presence of two subscribing witnesses.

CARL W. WEISS.

Witnesses:
   A. N. JESBERA,
   A. WIDDER.